United States Patent Office 3,084,928
Patented Apr. 9, 1963

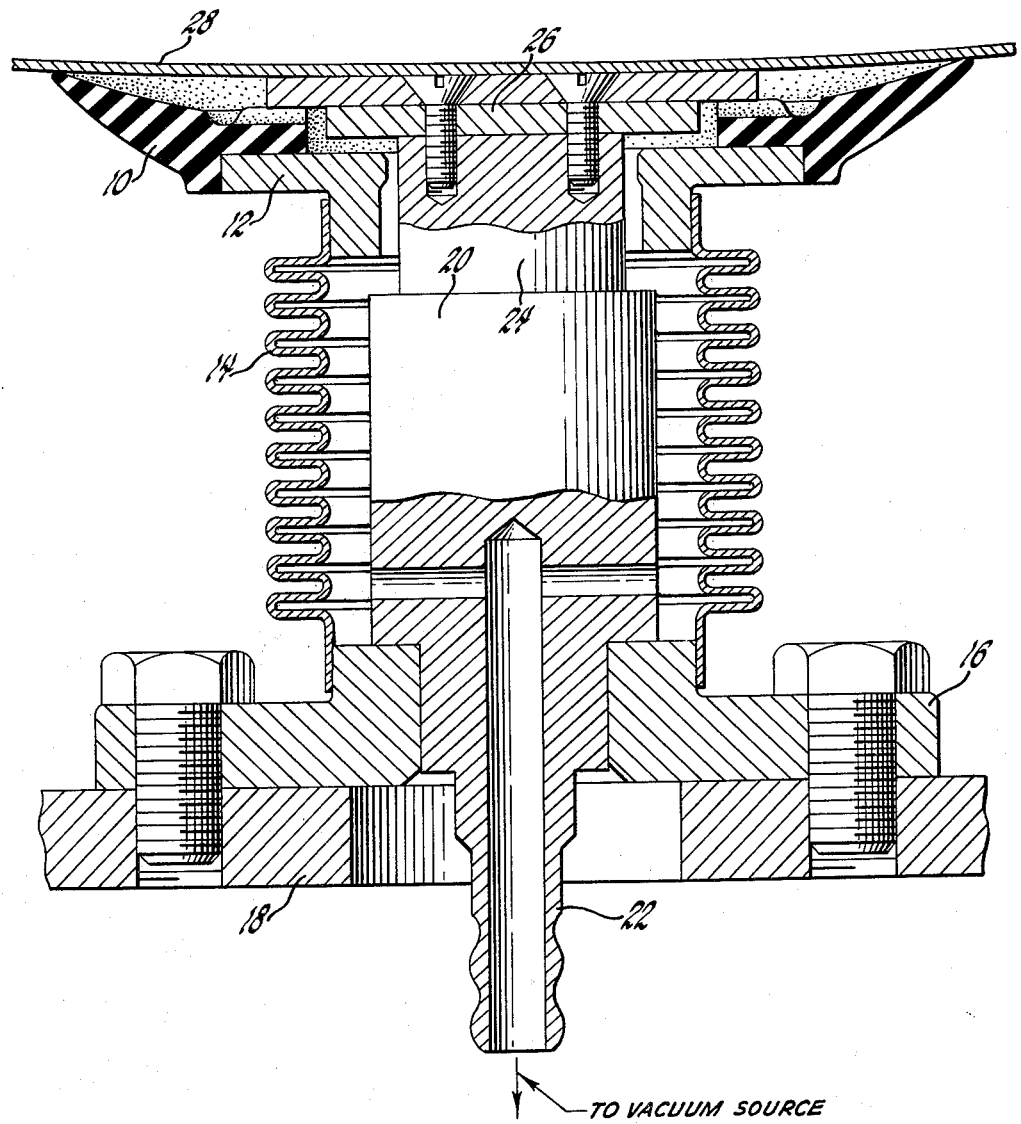

3,084,928
VACUUM CUP WITH INTEGRAL LOCATOR
Eric J. Opitz, Franklin, Mich., assignor to General Motors Corporation, Detroit, Mich., a corporation of Delaware
Filed Feb. 1, 1960, Ser. No. 6,002
1 Claim. (Cl. 269—21)

This invention relates to a work holder and more particularly to a vacuum work holder for maintaining a workpiece in proper position.

Various vacuum work holder means are found in the prior art for holding a workpiece or a plurality of workpieces in a desired location upon the working surface of a machine tool such as a grinding machine, milling machine or the like. It has been recognized that vacuum work holders tend to warp thin sheet materials by deflection within the vacuum cup. Such difficulties have led to many prior art illustrations of vacuum cups which are provided with a backing plate adapted to prevent inward deflection of the workpiece when vacuum is applied. Such vacuum cups are internally connected to a vacuum pump to provide sealing means to seal an elastic marginal lip of the cup against an adjacent surface of a workpiece. It is often desirable to use a plurality of such cups on the surface of a table or other holding surface.

In order to accurately support sheet metal material by providing a backing plate within the vacuum cup, the prior art devices have been unable to obtain sufficient flexibility of the cup member to adequately seal and secure a workpiece. In addition, the prior practice of providing an elastic lip that is directly connected to the backing plate has required the utilization of special transverse vacuum ports extending through the backup plate to the periphery of the cup member. Furthermore, none of the prior art devices have been provided with suitable disassembly means that would allow the replacement of a contoured backup plate with a differently contoured backup plate without disturbing either the vacuum cup or the vacuum connection. Thus, in many cases a laborious, time-consuming job was involved in changing the backup plate or the vacuum cup including the forcible separation of the sealing cup from the backing plate and/or the disassembly of vacuum source connections.

It is, therefore, an object of this invention to provide novel means for securely holding a thin sheet during a machining operation. It is also an object to provide means for supporting a thin sheet by a vacuum cup having a contoured backup plate releasably fixed centrally of the vacuum cup.

It is a particular object of this invention to provide a vacuum-type work holder provided with a novel, efficient work holding surface which adequately supports the work and permits adequate flexibility of the vacuum work holder. It is a further object of this invention to provide novelly constructed vacuum holding means whereby a workpiece may be held in operational position without deformation thereof. Another object of this invention is to provide a vacuum work holder having means for effecting a seal between the work and the holder by individually separable components that provide for easy removal and replacement of a contoured vacuum plate. It is another object of this invention to provide a vacuum work holder having a flexible vacuum cup supporting member novelly adapted to accommodate differently contoured workpieces.

Accordingly, the vacuum work holder of the present invention provides a vacuum cup for maintaining workpieces in a desired position; that is, axially, flexibly supported about a detachable centrally located contoured backup plate which is rigidly fixed to a support member. Other objects and advantages of the present invention will be readily apparent to those skilled in the art by reference to the following detailed description and the accompanying drawing which is a sectional view illustrating the preferred embodiment of my invention.

Referring now to the drawing, a sealing annulus or ring 10 made of any suitable resilient or elastomeric material such as molded rubber is fixedly supported by a collar member 12. A flexible bellows member 14 supports the collar member 12 and the sealing ring 10 at one end and is fixed at the other end to a support plate 16. The bellows member 14 is made of metal or other suitable material which will allow limited axial movement while effectively, rigidly supporting the sealing lip 10. The support member 16 is fixedly secured to a backup plate 18 and is centrally apertured to retainingly accommodate a support column member 20 that is provided with an integral vacuum hose fitting 22 and which is supported within but radially inwardly spaced from the flexible bellows member 14 to provide a vacuum passage. The upper portion 24 of the support member 20 is reduced in cross-section and protrudes through, but is radially inwardly spaced from, the support member 12 to provide a vacuum passage. Any suitable fastener means such as threaded holes are provided on the top of the upper extension portion 24 to accommodate cooperating locking means associated with a contoured backing plate 26 that is adapted to support a workpiece 28 and prevent deflection thereof due to the sealing action of the sealing ring 10. The contact surface of the backing plate 26 may be flat or provided with any suitable workpiece accommodating curvature. The backing plate 26 is suitably spaced from the sealing ring 10 and the support member 12 to provide vacuum passages extending to the inner peripheral surface of the sealing ring 10.

Thus, in operation the sealing lip 10 is axially moveable relative to the contoured backing plate 26 so that the workpiece 28 may be firmly seated against the contoured backing plate 26 and the desired sealing pressure maintained regardless of variations in the supported surface of the workpiece 28 or variations in the initial relative alignment of the vacuum holder and the workpiece. The vacuum source is connected to the inner peripheral surface of the sealing ring 10 through the central passages in the support member 20, axially outwardly through the bellows member 14, and through the space provided between the support plate 26 and the sealing ring assembly. The contoured backing plate 26 may be readily changed to provide differently contoured backing plates to accommodate a wide range of differently contoured workpieces 28. It is noted that a change of the contoured backing plate 26 will in no way affect the flexible cup 10 or any of the vacuum connections. In addition, the provision of the flexible bellows 14 allows a single vacuum cup 10 to accommodate a plurality of differently contoured backing plates without affecting the sealing engagement since the flexible annulus 10 is axially positionable relative to the backing plate 26 to obtain the optimum sealing position relative to a particular workpiece.

While I have shown only the preferred form of my invention, it should be understood that various changes or modifications in the details of construction and arrangement of the parts may be made within the scope of the appended claim without departing from the spirit of the invention.

I claim:

A vacuum cup for holding thin sheet articles by suction, comprising a sealing ring, a flexible support member for said sealing ring, a contoured backing plate disposed centrally of said sealing ring having a continuous unbroken outer surface adapted to engage and prevent inward deflection of the surface of said articles, a support member located centrally of said sealing ring and flexible support and extending therethrough, fastener means releasably connecting said backing plate to said support member for said backing plate, a vacuum source, and passages connecting said vacuum source to the space between said sealing ring and said backing plate, said passages consisting of a first passage extending axially a limited distance into said support member and second passages extending radially outwardly into the space between the backing plate support member and said flexible support member whereby a vacuum is applied to the surface of the article only in the area bounded by said backing plate and said sealing ring.

References Cited in the file of this patent

UNITED STATES PATENTS

| | | |
|---|---|---|
| 1,302,028 | Fuchs et al. | Apr. 29, 1919 |
| 1,384,278 | Slocombe | July 12, 1921 |
| 2,745,665 | Labombarde | May 15, 1956 |

FOREIGN PATENTS

| | | |
|---|---|---|
| 453,611 | Canada | Dec. 28, 1948 |
| 680,454 | Great Britain | Oct. 8, 1952 |
| 146,868 | Sweden | Sept. 7, 1954 |